United States Patent [19]
Beyrle et al.

[11] Patent Number: 5,378,746
[45] Date of Patent: Jan. 3, 1995

[54] PRIMER COMPOSITION CONTAINING AN ISOTACTIC CHLORINATED POLYPROPYLENE GRAFTED WTIH MALEIC ANHYDRIDE AND AN EPOXYSILANE

[75] Inventors: Andre Beyrle, Tracy-le-Val; Ann L'Her, Paris, both of France

[73] Assignee: Saint Gobain Vitrage International, Courbevoie, France

[21] Appl. No.: 61,071

[22] Filed: May 14, 1993

[30] Foreign Application Priority Data

May 14, 1992 [FR] France ................................ 92 05849

[51] Int. Cl.⁶ ............................ C08K 5/15; C08K 5/54
[52] U.S. Cl. .................................... 524/114; 524/188; 524/261; 524/265; 525/103; 525/106; 525/285
[58] Field of Search ............... 524/114, 188, 261, 265; 525/103, 106, 285

[56] References Cited

U.S. PATENT DOCUMENTS

| | | | |
|---|---|---|---|
| 5,102,937 | 4/1992 | Warren et al. | 524/261 |
| 5,135,984 | 8/1992 | Kinosada et al. | 525/193 |
| 5,274,039 | 12/1993 | Sirinyan et al. | 525/130 |

*Primary Examiner*—D. S. Nakarani
*Attorney, Agent, or Firm*—Oblon, Spivak, McClelland, Maier & Neustadt

[57] ABSTRACT

The present invention relates to an encapsulated glazing, a priming composition for treating a glazing, and a process for the adhesion of a thermoplastic profile to a glazing. The process consists of treating at least the area of the glazing to be covered with the profile with an organosilane and a composition based on a chlorinated polyolefin, the average molecular weight of which is between 1,000 and 300,000 (as determined by gel permeation chromatography), followed by encapsulating the treated glazing with a thermoplastic material, in order to form the profile. Preferably, the encapsulating step is performed by injecting.

8 Claims, No Drawings

PRIMER COMPOSITION CONTAINING AN ISOTACTIC CHLORINATED POLYPROPYLENE GRAFTED WTIH MALEIC ANHYDRIDE AND AN EPOXYSILANE

BACKGROUND OF THE INVENTION

1. Field of the Invention

The present invention relates to an encapsulated glazing, a primer composition for treating a glazing and a process for the adhesion of a thermoplastic profile to a glazing. This profile can be obtained by different processes, such as encapsulation or extrusion. The profile can, in particular, be formed on the periphery of the glazing. However, the profile can also be formed at any other point or area of the glazing (e.g., with a view to the bonding of the base of a driving mirror).

2. Discussion of the Background

The present invention is of a general nature. However, it may be most easily understood by examining the process of encapsulating or overmolding a glazing with a thermoplastic profile (or joint).

Glazings, particularly car glazings, can be encapsulated in two ways. The first method is the reactive injection molding (RIM) process, which consists of injecting a reaction mixture of two components into a mold in order to form a thermosetting polymer on the periphery of the glazing. For example, injection of a polyol component and an isocyanate component forms a polyurethane as the encapsulation joint. However, this method suffers from the disadvantage of requiring relatively sophisticated molds, which leads to relatively high production costs.

Another method consists of injecting a thermoplastic material to produce an overmolding profile on the glazing. Costs are lower than in the case of the RIM process. The thermoplastic injection method nevertheless requires high pressures. It is therefore not very suitable for large glazings such as rear windows or car windshields, which may break under such high pressures. However, it is completely suitable for small glazings, such as car side windows.

A currently used thermoplastic material is polyvinyl chloride (PVC). However, the presence of chlorine in the PVC encapsulation joints introduces problems, particularly when recycling the plastic materials. In addition, PVC compositions incorporate plasticizers, which can ruin some paints conventionally used for automobile bodies.

If one was to try to replace PVC with a different thermoplastic material, more specifically an olefinic thermoplastic (i.e., having an olefin matrix), such as ethylene, propylene, or a copolymer thereof, one would encounter the disadvantage of the poor affinity of the olefinic thermoplastic with other materials, and in particular, with glass, due to the apolar nature of these thermoplastic materials.

SUMMARY OF THE INVENTION

Accordingly, one object of the present invention is to provide a novel process for the encapsulation of a glazing, which improves the adhesion of an encapsulation joint composed of a thermoplastic having an olefin matrix, particularly polypropylene filled with a copolymer of the "ethylene-propylene-diene-monomer" type (EPDM).

A further object of the present invention is to provide a novel process for encapsulating a glazing, which improves the adhesion of a thermoplastic profile to the glazing.

A further object of the present invention is to provide a novel process for the encapsulation of a glazing avoiding the use of PVC.

A further object of the present invention is to provide a novel glazing encapsulated with a thermoplastic material other than PVC.

A further object of the present invention is to provide a novel priming composition for treating a glazing, which subsequently improves the adhesion between the glazing and a thermoplastic profile.

These and other objects which will become apparent during the following detailed description of the preferred embodiment, have been provided by a process comprising treating an area of a glazing with a composition comprising at least one organosilane and at least one chlorinated polyolefin to provide a treated glazing, the area of the glazing comprising at least the area to be covered with a thermoplastic material, and encapsulating the treated glazing with a thermoplastic material.

DETAILED DESCRIPTION OF THE PREFERRED EMBODIMENTS

According to the present invention, at least the area of the glazing to be covered with the encapsulation joint is treated with at least one organosilane and a composition containing at least one chlorinated polyolefin (designated hereinafter by the term "priming composition"). The chlorinated polyolefin has affinities with olefinic thermoplastic materials, and brings about a satisfactory and durable bond between the encapsulation joint and the glass, or optionally, the enamelled layer covering the glass, by means of the organosilane.

According to the present invention, the problem caused by olefinic thermoplastics, which have a poor affinity with the other materials in a glazing (e.g., glass or enamel), is consequently solved by a process for adhering a thermoplastic profile to a glazing, particularly a car glazing, comprising treating at least the area of the glazing to be covered with the thermoplastic profile with an organosilane and a composition containing a chlorinated polyolefin, the chlorinated polyolefin having an average molecular weight between 1000 and 300,000, preferably between 10,000 and 100,000, as determined by gel permeation chromatography (GPC).

The term "glazing" refers to either an uncoated sheet or pane of window glass, or alternatively, a sheet or pane window of glass treated with enamel. The present method has particular industrial applicability for glass windows for cars.

The term "profile⇌ or "joint" refers to the encapsulating material in the final product; i.e., the thermoplastic material adhered to the glazing. The term "periphery" refers to the areas of the glazing nearest the outermost edges of the major surfaces; i.e., the area of the glazing within 10 cm, preferably within 4 cm, most preferably within 2.8 cm, of an edge of the glazing.

The present invention also relates to an improved method of providing an encapsulated glazing, more particularly of producing an overmolding profile with a thermoplastic material. The present invention replaces PVC with different thermoplastic material, more specifically, elastomeric thermoplastics, and more particularly olefinic thermoplastics (i.e., having an olefin matrix), such as a filled EPDM polypropylene.

In one embodiment of the invention, the treating step is carried out in two stages. The first stage involves depositing a layer containing at least one organosilane on the area of the glazing to be encapsulated with the thermoplastic profile. The second stage of the treating step involves depositing a composition containing at least one chlorinated polyolefin on the organosilane layer.

In an advantageous variant of the present invention, the treating step is performed in a single stage by depositing on that part of the glazing which is to receive the profile, preferably the glazing periphery, a composition containing a chlorinated polyolefin and an organosilane.

According to a feature of the present invention, depositing the priming composition takes place at ambient temperature (from about 15° C. to about 30° C.), and is followed by heating at a temperature of from at least 80° C. to 120° C. When the priming composition contains a solvent, the temperature of from 80° C. to 120° C. is maintained sufficiently long to evaporate the solvent.

According to a preferred embodiment, the glass is kept at a temperature exceeding 80° C. when the thermoplastic is injected. Thereby, adhesion between the glass and the profile is further improved.

The process according to the present invention has the advantage of not requiring isocyanate handling operations, as is often the case with methods of adhering polymeric profiles to glazings.

The present invention also encompasses a glazing, particularly a car glazing, which has an encapsulation joint (or profile), for example, over its entire periphery, the joint or profile comprising an elastomeric thermoplastic, and preferably, an olefinic thermoplastic. According to a preferred embodiment of the present invention, the encapsulation joint is made from an EPDM-filled polypropylene.

Moreover, the encapsulation joint of the present invention preferably contains no plasticizers. As a result, the joint is no longer a cause of certain paints deteriorating. This type of joint also is resistant to damage from ultraviolet rays.

The thus-obtained glazing has the advantage of not harming the environment during recycling or destruction of the glazing, because the encapsulation joint contains no chlorine. Even if the priming composition does contain chlorine, the quantity of chlorinated polyolefin deposited on the glazing is virtually negligible, and therefore, constitutes no risk for the environment. Accordingly, the chlorinated polyolefin deposited on the glazing is preferably deposited in an amount providing from 0.001 g to 10 g of chlorinated polyolefin per square meter of surface area of the glazing, preferably from 0.1 to 1 g of polyolefin/m² of glazing to be encapsulated.

The primer composition of the present invention may further contain a solvent. Suitable solvents include aliphatic hydrocarbons, such as pentane, hexane, heptane and isomers thereof; aromatic hydrocarbons, such as benzene, toluene and o-, m- and p-xylene; halogenated hydrocarbons containing from 1 to 4 carbon atoms and from 1 to 10 halogen atoms, such as methylene chloride, chloroform, carbon tetrachloride, dichlorofluoromethane, dichloroethane, trichloroethane, dichlorodifluoroethane, dichlorotrifluoroethane, dichlorotetrafluoroethane, trichlorotrifluoroethane, and the like; ethers, such as diethyl ether, methyl t-butyl ether, dibutyl ether, etc.; cyclic ethers, such as tetrahydrofuran and dioxane, etc. The solvent may be present in an amount necessary to dissolve the organosilane and/or the chlorinated polyolefin, and/or in an amount sufficient to provide a desired concentration of organosilane and/or polyolefin per unit surface area of the glazing.

Finally, the present invention proposes a priming composition for adhering a thermoplastic profile to a glazing.

According to the present invention, the priming composition is based on a chlorinated polyolefin, which is preferably a modified chlorinated polyolefin; i.e., having OH and/or COOH functional groups therein. More specifically, the priming composition according to the present invention is based on isotactic chlorinated polypropylene, grafted with maleic anhydride.

The chlorine contained in the priming composition must be present in a sufficiently high quantity to ensure wettability during deposition. However, its content must not be too high, so as not to harm the adhesion properties of the priming composition.

Therefore, according to the present invention, the weight content of the chlorine atoms in the priming composition is from 10 to 40%, and preferably, from 25 to 30% by weight of the priming composition.

The average molecular weight of the chlorinated polyolefin is preferably from 1000 to 300,000, and is particularly preferably from 10,000 to 100,000, as determined by GPC.

As stated hereinbefore, the treating step can take place in two stages, the priming composition then being deposited during the second stage on an organosilane-based layer. In the case of a single stage process, the organosilane is included in the priming composition. The organosilane is preferably an epoxysilane, and is present in an amount of from 0.01 to 10%, and preferably approximately 1%, by weight of the priming composition. Examples of preferred epoxysilanes include those of the formula R'SiR₃, where each R group is independently an alkyl or alkoxy group of from 1 to 4 carbon atoms and R' is a group of the formula:

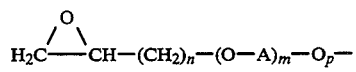

where n, m and p are each independently 0 or 1, and A is lower alkylene of from 2 to 6 carbon atoms. Most preferably, the organosilane is glycidyl-3-oxypropyl trimethoxy silane.

Other features of the invention will become apparent in the course of the following descriptions of exemplary embodiments which are given for illustration of the invention and are not intended to be limiting thereof.

EXAMPLE 1

An encapsulated glazing for a car, e.g., a side window, is produced by injecting a thermoplastic EPDM-filled polypropylene onto the periphery of said glazing.

The glazing initially has an enamelled area over its entire periphery. A primer composition is prepared, containing an isotactic chlorinated polypropylene grafted with maleic anhydride, the chlorine content being approximately 27%. This composition also contains 1% by weight glycidyl-3-oxypropyl trimethoxy silane.

The enamelled area of the glazing to be covered with the profile is coated with this solution at an ambient temperature (from about 15° C. to about 30° C.). The glass temperature is then raised to 140° C. The thermoplastic is then injected at a temperature close to 200° C. in a mold at 80° C. During thermoplastic injection, the glazing is maintained at a temperature of 140° C., and after injection is complete, the encapsulated glazing is dismantled (i.e., removed from its mold).

After 24 hours, the adhesion H0 is measured by peeling at 90° C. A second measurement H7 is performed after aging for 7 days at 70° C. under humid cataplasm conditions.

The adhesion values desired for H0 and H7 are, respectively, 40 N/cm and 10 N/cm. The values observed in this experiment are 90 N/cm for H0 and 60 N/cm for H7.

EXAMPLE 2

The procedure of Example 1 is repeated, except during thermoplastic injection, the glazing was not maintained at a temperature exceeding 80° C. (i.e., the glazing was maintained at ambient temperature). The measured values are 50 N/cm for H0 and 30 N/cm for H7.

The results obtained are still satisfactory but, compared with those of Example 1, it is preferable to maintain the glazing at a high temperature during thermoplastic injection.

EXAMPLE 3

The procedure of Example 2 is repeated, except that the glazing temperature after coating with the priming composition is not raised. The values H0 and H7 in this experiment are both below 10 N/cm, and consequently, are inadequate compared with the sought values.

EXAMPLE 4

A glazing for a motor vehicle, e.g., a rear window, is manufactured, a thermoplastic material being extruded on the periphery. This thermoplastic material is an EPDM-filled polypropylene.

The deposition of the composition prior to extrusion takes place in accordance with the method described in Example 1.

The values measured are satisfactory.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A priming composition, comprising an isotactic chlorinated polypropylene grafted with maleic anhydride, and an epoxysilane.

2. The priming composition of claim 1, wherein the weight content of chlorine atoms in the isotactic chlorinated polypropylene grafted with maleic anhydride is from 10% to 40% by weight of said priming composition.

3. The priming composition of claim 2, wherein said weight content of said chlorine atoms is from 25 to 30% by weight of the priming composition.

4. The priming composition of claim 1, wherein said isotactic chlorinated polypropylene grafted with maleic anhydride has an average molecular weight of between 10,000 and 100,000 as determined by gel permeation chromatography.

5. The priming composition of claim 1, wherein said epoxysilane is present in an amount of from 0.01% to 10% by weight of the priming composition.

6. The priming compositions of claim 5, wherein said epoxysilane is present in an amount of about 1% of said priming composition.

7. The priming composition of claim 1, wherein said epoxysilane has the formula R'SiR$_3$, where each R group is independently an alkyl or alkoxy group of from 1 to 4 carbon atoms and R' is a group of the formula:

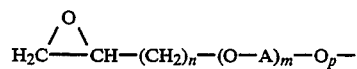

wherein n, m and p are each independently 0 or 1, and A is lower alkylene of from 2 to 6 carbon atoms.

8. The priming composition of claim 7, wherein said epoxysilane is glycidyl-3-oxypropyl trimethoxy silane.

* * * * *